US008559925B2

(12) United States Patent
Zhang

(10) Patent No.: US 8,559,925 B2
(45) Date of Patent: Oct. 15, 2013

(54) INTERACTING METHOD FOR UE FAST SELECTING MOBILE COMMUNICATION NETWORK TO ACCESS IN A WLAN INTERWORKING NETWORK

(75) Inventor: Wenlin Zhang, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1189 days.

(21) Appl. No.: 10/573,977

(22) PCT Filed: Sep. 13, 2004

(86) PCT No.: PCT/CN2004/001042
§ 371 (c)(1),
(2), (4) Date: Feb. 13, 2007

(87) PCT Pub. No.: WO2005/032051
PCT Pub. Date: Jul. 4, 2005

(65) Prior Publication Data
US 2007/0190974 A1    Aug. 16, 2007

(30) Foreign Application Priority Data
Sep. 30, 2003  (CN) .................................. 03 1 43395

(51) Int. Cl.
*H04W 4/00* (2009.01)
(52) U.S. Cl.
USPC .......................................... 455/411; 370/328
(58) Field of Classification Search
USPC ............... 455/426, 411, 426.1; 370/338, 328; 713/202
See application file for complete search history.

(56) References Cited

U.S. PATENT DOCUMENTS

| 7,184,768 B2 * | 2/2007 | Hind et al. ................. 455/435.3 |
| 2003/0051041 A1 | 3/2003 | Kalavade et al. |

(Continued)

FOREIGN PATENT DOCUMENTS

| CN | 1434610 A | 8/2003 |
| EP | 1 662 813 | 5/2006 |

(Continued)

OTHER PUBLICATIONS

3GPP: "3rd Generation Partnership Project; Technical Specification Group Services and Sysstems Aspects; 3GPP system to Wireless Local Area Network Internetworking; System Description (Release 6)"; pp. 1-77.

(Continued)

*Primary Examiner* — James Wozniak
*Assistant Examiner* — Kuo Woo
(74) *Attorney, Agent, or Firm* — Slater & Matsil, L.L.P.

(57) ABSTRACT

The present invention discloses an interacting method for WLAN UE fast selecting an optimal mobile communication network to access in WLAN, first a WLAN UE judges whether the identity information of the WLAN AN exists in the WLAN identity information stored when mobile connection with the WLAN AN is established, if so, the network selection information corresponding to the identity of the WLAN stored will be sent to the WLAN AN, otherwise, a pre-configured mobile communication network with highest priority is regarded as network selection information to be sent to the WLAN AN; the WLAN AN identifies the mobile communication network to access according to the network selection information carried in Authentication Request, and connects the WLAN UE to the selected network to implement authentication. The method makes the WLAN UE select a mobile communication network to access rapidly when the WLAN UE accesses from a WLAN connected with multiple mobile communication networks.

15 Claims, 6 Drawing Sheets

(56) References Cited

U.S. PATENT DOCUMENTS

| | | | |
|---|---|---|---|
| 2003/0139180 A1* | 7/2003 | McIntosh et al. | 455/426 |
| 2004/0029580 A1* | 2/2004 | Haverinen et al. | 455/426.1 |
| 2004/0064741 A1* | 4/2004 | Haverinen et al. | 713/202 |
| 2004/0066756 A1* | 4/2004 | Ahmavaara et al. | 370/328 |
| 2004/0066769 A1* | 4/2004 | Ahmavaara et al. | 370/338 |

FOREIGN PATENT DOCUMENTS

| | | |
|---|---|---|
| JP | 11-205342 A | 7/1999 |
| JP | 2007-534193 | 11/2007 |
| WO | WO 03/037023 | 5/2003 |
| WO | WO 03/065654 A1 | 8/2003 |

OTHER PUBLICATIONS

3GPP Organizational Partners, "3rd Generation Partnership Project; Technical Specification Group Services and System Aspects; 3GPP System to Wireless Local Area Network (WLAN) Internetworking; System Description (Release 6)"; 3GPP, Sep. 29, 2003, 3GPP TS 23.234 V2.0.0, pp. 1-68.

Draft 3GPP TS 23.234 V1.10.0: 3rd Generation Partnership Project;Technical Specification Group Services and System Aspects;3GPP system to Wireless Local Area Network (WLAN) Interworking;System Description(Release 6) , dated May 2003; total 74 pages.

3GPP TS 33.234 V0.6.0: 3rd Generation Partnership Project;Technical Specification Group Service and System Aspects;3G Security;Wireless Local Area Network (WLAN) Interworking Security;(Release 6), dated Sep. 2003; total 47 pages.

Office action issued in corresponding European patent application No. 04762176.8 , dated Apr. 19, 2007; total 6 pages.

Office action issued in corresponding European patent application No. 04762176.8 , dated Oct. 22, 2007; total 4 pages.

Oral proceeding issued in corresponding European patent application No. 04762176.8 , dated Oct. 29, 2008; total 4 pages.

Written opinion issued in corresponding PCT application No. PCT/CN2004/001042 , dated Dec. 23, 2004; total 4 pages.

* cited by examiner

INTERACTING METHOD FOR UE FAST SELECTING MOBILE COMMUNICATION NETWORK TO ACCESS IN A WLAN INTERWORKING NETWORK

CROSS-REFERENCE TO RELATED APPLICATIONS

This application is a National Stage of Patent Cooperation Treaty (PCT) Application No. PCT/CN2004/001042 filed Sep. 13, 2004, entitled, A FAST INTERACTIVE METHOD OF USER TERMINAL IN THE WIRELESS LOCAL AREA NETWORK (WLAN) SELECTING ACCESS MOBILE NETWORK, which claims priority to Chinese Patent Application No. CN 03143395.2 filed Sep. 30, 2003, all of the disclosure of which are hereby incorporated by reference in their entirety.

FIELD OF THE TECHNOLOGY

The present invention relates to network access technologies, and particularly to an interacting method for User Equipment (UE) fast optimal access mobile communication network in a Wireless Local Area Network (WLAN) interworking network.

BACKGROUND OF THE INVENTION

With the increasing demand of users for radio access rate, WLAN emerges as the time require, for it can provide a fast wireless data access within a relatively small region. WLAN involves various kinds of techniques, one of the most extensively used technical standard of which is IEEE 802.11b, whose frequency band is 2.4 GHz with data transmission rate up to 11 Mbps. Other technical standards using the same frequency band include IEEE 802.11g and Bluetooth, wherein the data transmission rate of IEEE 802.11g is up to 54Mbps. Other new standards of WLAN, such as IEEE 802.11a and ETSI BRAN Hiperlan2, use the frequency band of 5 GHz, with the transmission rate up to 54 Mbps as well.

Although WLAN involves various kinds of wireless access techniques, most WLAN techniques utilize IP data packets for data transmission. The specific WLAN access technique is usually transparent to the upper IP level in a wireless IP network which is usually configured with Access Points (AP) for UE radio access, and with controlling and connecting devices for IP data transmission.

Along with the appearance and development of WLAN, the inter-working of WLAN with various mobile communication networks, such as GSM, Code Division Multiple Access (CDMA), Wideband Code Division Multiple Access (WCDMA), Time Division-Synchronous Code Division Multiple Access (TD-SCDMA) and CDMA2000 has become the focus of researches. These WLAN interworked with mobile communication networks are called interworking WLAN. And interworking WLAN and mobile communication networks connected with it constitute WLAN interworking networks. Typical WLAN interworking network includes 3GPP-WLAN interworking network defined by 3GPP, 3GPP2-WLAN interworking network defined by 3GPP2, and so on. In accordance with $3^{rd}$ Generation Partner Project (3GPP) standards, via the access network (AN) of a WLAN, a UE is able to connect with not only Internet or Intranet, but the home network or visited network of a 3GPP system. More specifically, and when a WALN UE roams, it will be connected with the 3GPP visited network via the WLAN AN. A part of entities of the 3GPP visited network interworks with its corresponding entity of the 3GPP home network respectively, for example, as shown in FIG. 1, 3GPP Authentication, Authorization and Accounting (AAA) Agent in a 3GPP visited network interworks with 3GPP AAA Server in the 3GPP home network; WLAN Access Gateway (WAG) of the 3GPP visited network interworks with Packet Data Gateway (PDG) of the 3GPP home network, and etc. When a WLAN UE accesses in non-roaming case, it will be connected with the 3GPP home network via the WLAN AN, as shown in FIG. 2. FIG. 1 is a schematic diagram illustrating the architecture of the networking of a WLAN system and a 3GPP system in roaming case; while FIG. 2 is a schematic diagram illustrating the architecture of the networking of a WLAN system and a 3GPP system in non-roaming case.

As shown in FIG. 1 and FIG. 2, a 3GPP system primarily comprises Home Subscriber Server (HSS)/Home Location Register (HLR), 3GPP AAA Server/Proxy, WAG, PDG, Charging Gateway (CGw)/Charging information Collecting Function (CCF) and Online Charging System (OCS). WLAN UE, WLAN AN and all the entities of the 3GPP system together construct a 3GPP-WLAN interworking network, which can be used as a WLAN service system. In this service system, 3GPP AAA Server is in charge of the authentication, authorization and accounting for a WLAN UE, collecting the charging information sent from the WLAN AN and transferring the charging information to the charging system; PDG bears the burden of transmitting the user's data from the WLAN AN to the 3GPP network or other packet switching networks; and the charging system is in charge of receiving and recording the user's charging information transferred from the network, wherein OCS instruct the network to send online charging information periodically in accordance with the expenses of the online charged users, meanwhile making statistics and keeping it under control.

Except for roaming, when a WLAN UE desires to access the Internet/Intranet directly, it has access to the Internet/Intranet via the WLAN AN after accomplishing the accessing authentication process with AAA server (AS). If the WLAN UE desires to access services of 3GPP PS domain as well, it should further request for the service of Scenario 3 from the 3GPP home network, which is as follows: the WLAN UE initiates a Service Authentication Request to the AS of the 3GPP home network, the AS sends an Access Permission Message and assigns a corresponding PDG to the WLAN UE when the request is acceptable; after a tunnel between the WLAN UE and the assigned PDG is established, the WLAN UE gains access to the services of 3GPP PS domain. At the same time, CGw/CCF and OCS record the accounting information according to the network usage of the WLAN UE. Under the circumstances of roaming, when a WLAN UE desires to access the Internet/Intranet directly, it can request the 3GPP home network for accessing the Internet/Intranet via the 3GPP visited network. If the WLAN UE desires to access 3GPP PS domain and request for the service of Scenario 3 as well, it needs to initiate a Service Authentication procedure to the 3GPP home network via the 3GPP visited network. Similarly, this procedure will be carried out between the WLAN UE and the AS of the 3GPP home network. After the authentication, the AS assigns a corresponding home PDG to the WLAN UE, and after a tunnel between the WLAN UE and the assigned PDG is established via the WAG in the 3GPP visited network, the WLAN UE gets access to the services of 3GPP PS domain.

As shown in FIG. 3, in a 3GPP-WLAN interworking network, if a WLAN connects with a plurality of 3GPP visited networks, i.e. a plurality of Mobile communication Networks, simultaneously, where, the 3GPP visited network refers to a Visited Public Land Mobile Network (VPLMN), after accessing the WLAN, a WLAN UE needs to select a VPLMN to access. Take an example in China, a WLAN AN connects to a couple of VPLMN Operation Network of China Mobile and China Unicom at the same time, then after a user of China Unicom accesses the WLAN, it needs to indicate the WLAN AN that it needs to access the VPLMN Operation Network of China Unicom.

For another example, a French user roams to a WLAN of China, if its home network has roaming protocols with both China Mobile and China Unicom at the same time and the WLAN AN connects to both China Mobile and China Unicom, a accessing VLPMN needs to be selected, after the French user accesses the WLAN. Then, how does the WLAN UE select the network to be accessed, how does it inform the WLAN AN the network selection information, and how does a 3GPP-WLAN interworking network implement interactive process according to the network selection information. All of the above questions are resolved by the following scheme: the WLAN UE sends the network selection information to the WLAN AN through an Authentication Request, the WLAN AN identifies the mobile communication network which the WLAN UE desires to access according to the carried network selection information, and connects the current WLAN UE with the selected network to implement authentication and subsequent operations.

However, if the WLAN UE implements network selection every time it accesses, the network resource will be greatly consumed. For example, when a user roams to other places, the home mobile communication network of the user does not directly connect to the WLAN AN which the WLAN UE currently belongs to; if the WLAN UE carries its home network as an initial selected network to the WLAN AN each time the user accesses to the WLAN, a network selection procedure will be triggered. In this procedure, the WLAN network sends network selection information to the WLAN UE who will access a network after judging and selecting, which will consume the network resource and delay the access. However, for the WLAN UE who has accessed a new WLAN network, simply adopting the previously selected mobile communication network may not guarantee that the current selected network is an optimal PLMN network. In another word, when the WLAN UE switches to a new WLAN network, the default mobile communication network it accesses or a mobile communication network formerly selected is likely to be used, for there is a roaming relationship between the above mobile communication network and the home network of the WLAN UE. But the new WLAN network of the WLAN UE possibly has a direct connection with a Home Public Land Mobile Network (HPLMN) or some other better VPLMN. However, since there has been a default or selected mobile communication network to route, new network selection can not be implemented anymore, which means the WLAN UE can not be guaranteed to select an optimal PLMN network, such as a HPLMN, in the current WLAN.

How to guarantee a WLAN UE in a WLAN connected with a plurality of mobile communication networks to select a proper mobile communication network to access whenever the WLAN that the UE belongs to changes? A scheme is proposed, which makes use of the mobile communication network information of the last successful access as network selection information, and makes the current WLAN UE select an optimal mobile communication network to access; but since the above scheme is implemented by making use of the latest network selection results, if the judgment of whether the current WLAN changes is made based on the realization of an AP identity, i.e. the judgment is made whether the AP identity changes, the object of rapid access can not be obtained under the circumstances that the users frequently switch among APs.

SUMMARY OF THE INVENTION

The present invention provides an interacting method for a WLAN UE fast optimally access mobile communication network to access in WLAN, which comprises the following steps:

after a WLAN UE establishing a wireless connection with a WLAN AN, the WLAN AN or the WLAN UE initiating an authentication procedure, the WLAN AN sending a User Identity Request message to the WLAN UE;

on receiving the User Identity Request message, the WLAN UE deciding network selection information to be carried based on the information of the WLAN covering the WLAN UE and/or the WLAN information stored in the WLAN UE, and returning a message carrying the decided network selection information to the WLAN AN;

the WLAN AN deciding whether the network selection information in the received message indicates a mobile communication network to which the WLAN AN is able to route an authentication request message, if yes, the authentication request message of the WLAN UE will be forwarded to the mobile communication network indicated in the network selection information, otherwise, the network sending a notification signal to the WLAN UE, and the WLAN UE performing subsequent operations according to the notification signal.

According to the interacting method for WLAN UE fast access an optimal mobile communication network in a WLAN provided by this invention, when the WLAN UE sends an Authentication Request carrying the network selection information of itself to the WLAN AN, it firstly compares the identity information of the current WLAN with the identity information stored in itself, if there is a good match, the network selection information corresponding to the identity stored in the WLAN UE will be sent to the WLAN AN; otherwise, the pre-configured mobile communication network with the highest priority will be sent to the WLAN AN as the network selection information, so that it can guarantee that roaming users can select a mobile communication network to access in time, and repeated selection of the AN can be avoided each time the WLAN UE accesses, so the WLAN UE can select a mobile communication network to access rapidly according to its demands.

DETAILED DESCRIPTION OF THE EMBODIMENTS

Figure 1:
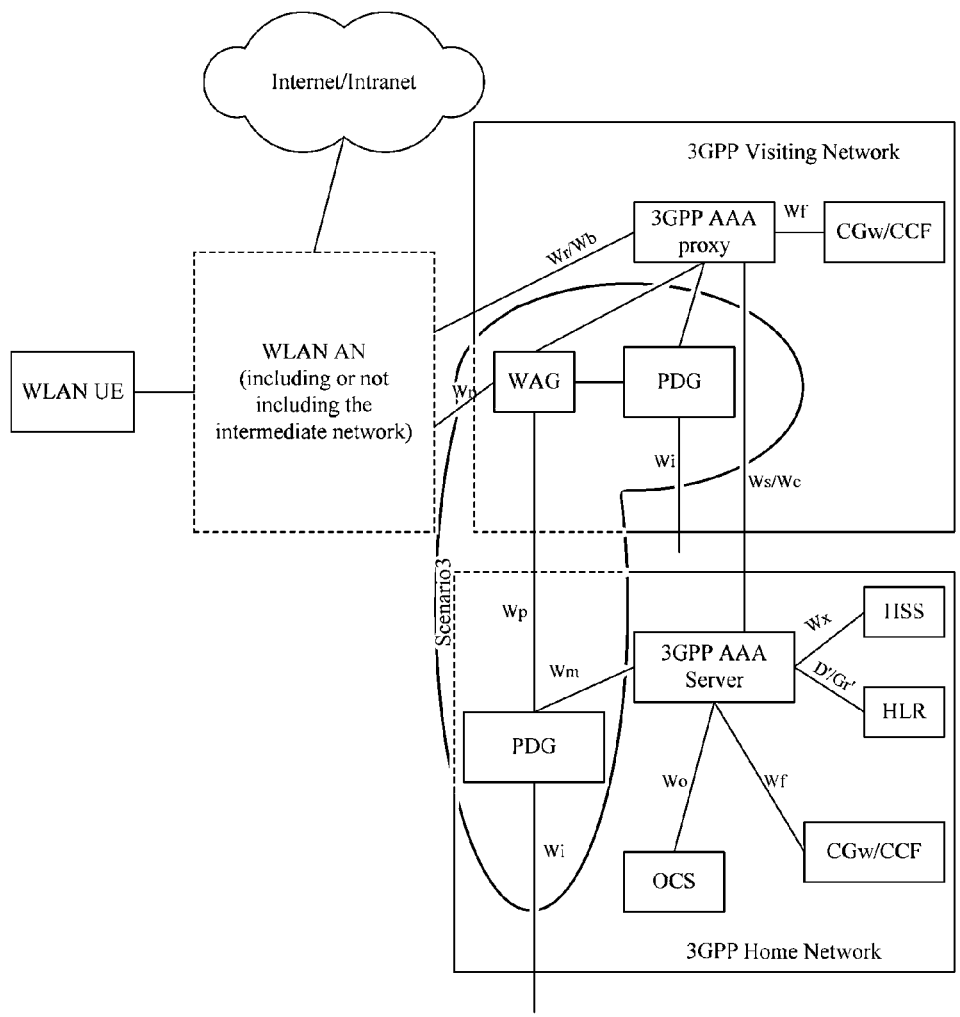
FIG. 1 is a schematic diagram illustrating the architecture of the networking of a WLAN system and a 3GPP system in roaming case.
Figure 2:
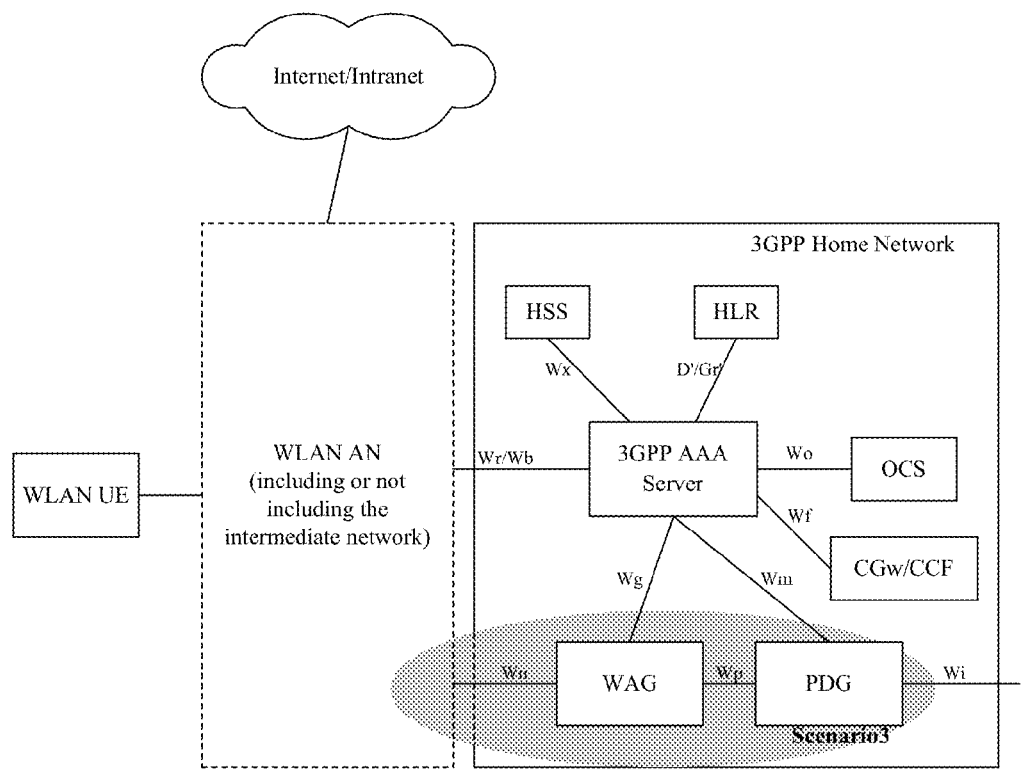
FIG. 2 is a schematic diagram illustrating the architecture of the networking of a WLAN system and a 3GPP system in non-roaming case.

According to preferred embodiments of the present invention, a WLAN UE judges whether the identity information of the current WLAN AP is stored in during the authentication procedure. If yes, the WLAN UE sends the network selection information corresponding to the identity of the current WLAN AP to the WLAN AN; otherwise, sends the network selection information corresponding to a pre-configured mobile communication network with highest priority to the WLAN AN; the WLAN AN identifies the mobile communication network that the current WLAN UE desires to access according to the network selection information carried in the Authentication Request, and connects the WLAN UE to the selected network to implement authentication and subsequent operations, so it guarantees that the WLAN UE selects a most appropriate mobile communication network to access rapidly.

Here, the network selection information refers to the information of a mobile communication network, which is connected with the WLAN AN and currently to be accessed by the WLAN UE. The selecting information can be either set in advance by the WLAN UE or selected by the WLAN UE according to the advertised information of the mobile communication network. The network selecting information can be configured either in a specially set field or in User Identity Field defined in NAI format in the Authentication Request.

Usually, if a WLAN UE changes its location and switches into a new WLAN AN, the corresponding SSID or APID will change. In general, one SSID corresponds to at least one WLAN Internet Service Provider (WISP), and for each WISP, the connected PLMN which has roaming relationship with it is basically definite, so the access demands would be satisfied by selecting an optimal mobile communication network to access according to the SSID; yet under some circumstances, PLMNs connecting with the WLAN with the same SSID can be different because of different geographic locations, as for adopting SSID or APID or other detect parameters to judge which mobile communication network to access should depend on parameter configuration by users. Since SSID possibly be the same after roaming to other locations, and SSID has not been normalized as a global criterion at present, users can be periodically prompted whether to implement network optimal selection by artificial setting, adopting the optimal network searching mode.

The judgment of which mobile communication to access can be implemented only based on AP address so as to avoid the fact that the roaming relationship between certain providers changes with their locations, for the MAC address of an AP is globally unique. For example, in Beijing, all the providers are directly connected with WLAN X, then the mobile communication network corresponding to each provider doesn't have roaming relationship with WLAN X; while in Shanghai, only one provider has direct connection relationship with WLAN X, then the users of other providers need roaming so as to access WLAN X.

Figure 3:
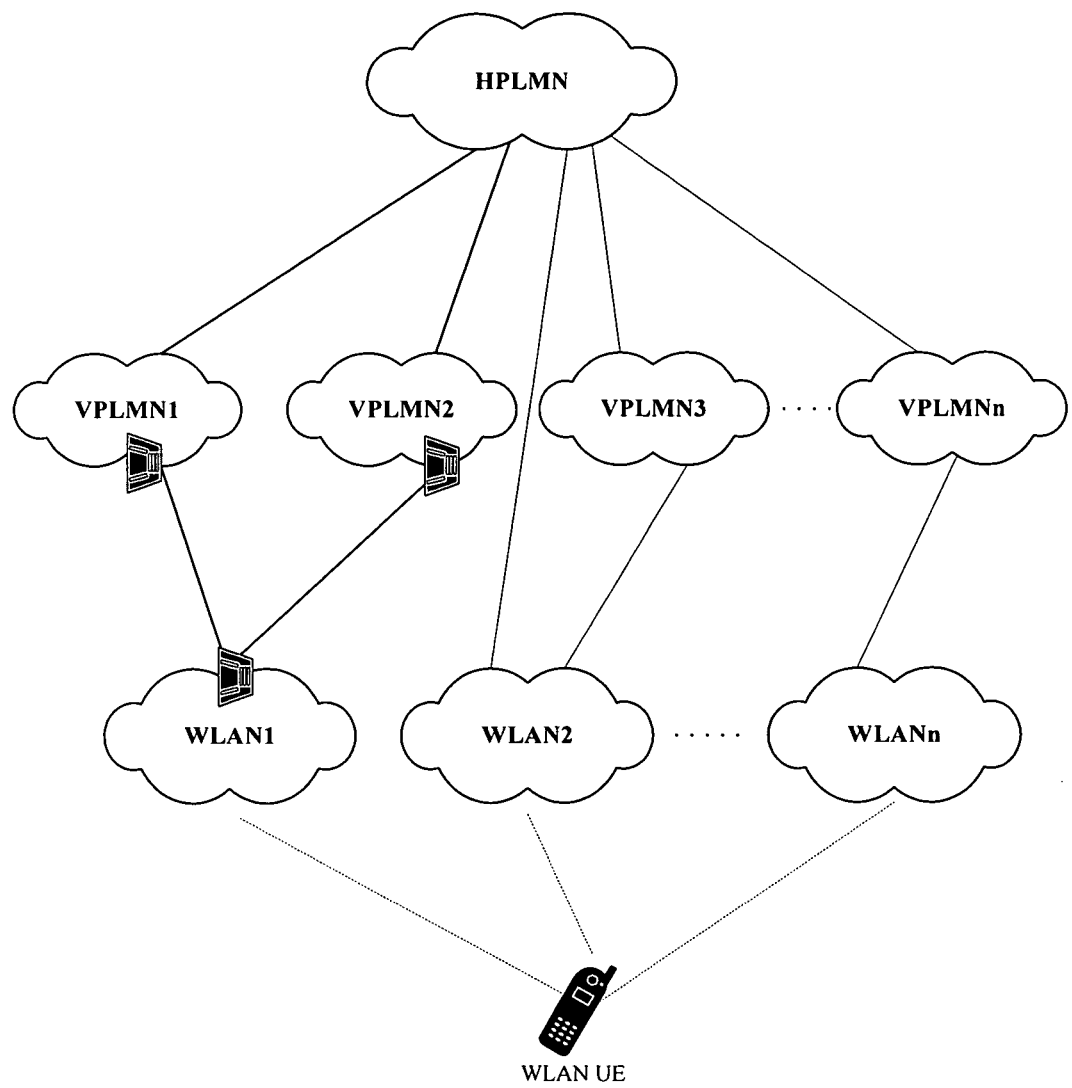
FIG. 3 is a schematic diagram illustrating the architecture of the networking of a WLAN connecting with a plurality of visited networks.
Figure 4:
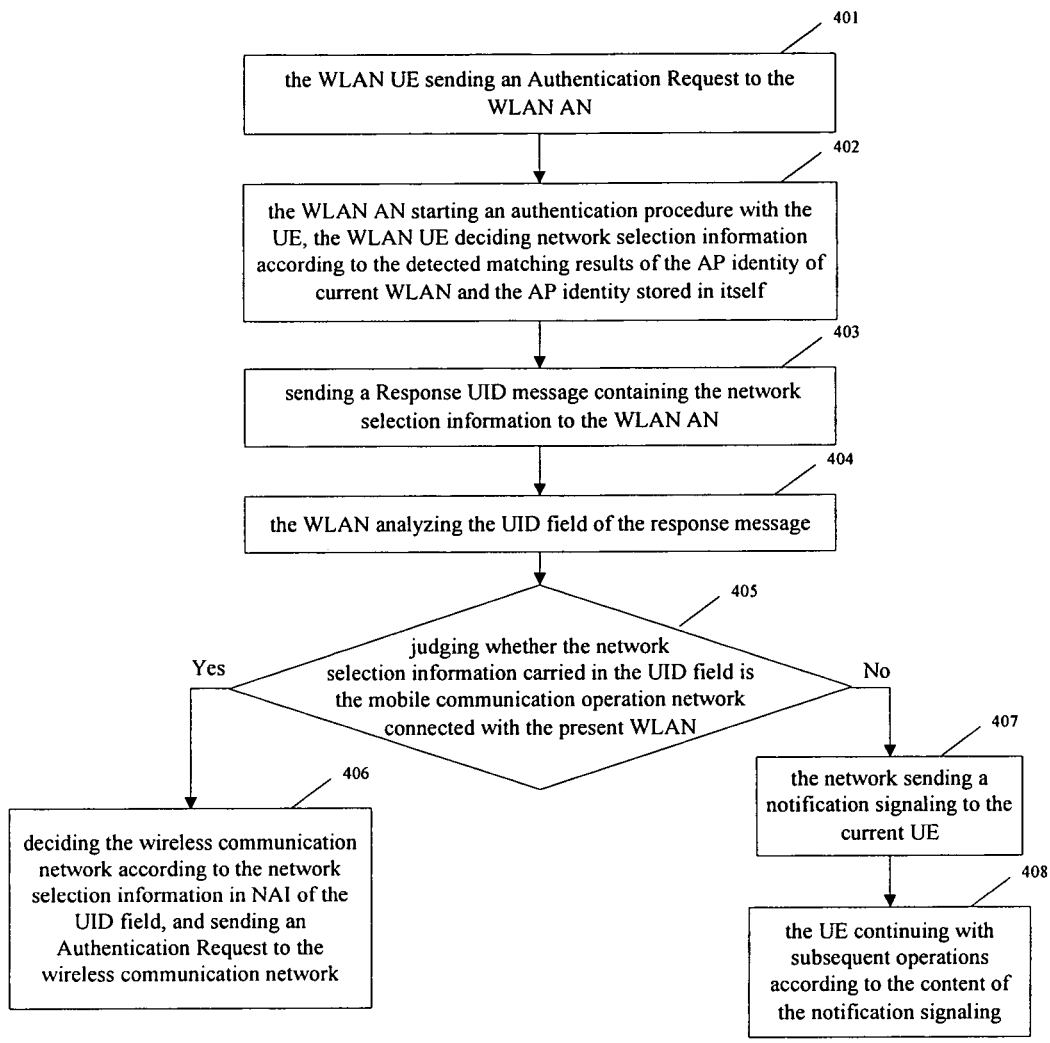
FIG. 4 is a flow chat illustrating an interacting process for the WLAN UE fast selecting an optimal mobile communication network to access according to one embodiment of the present invention.

Based on the network structure shown in FIG. 3, an interacting process of the WLAN UE fast selecting an optimal mobile communication network to access according to the present invention is shown in FIG. 4, comprising:

Step 401: when a WLAN UE accesses a 3GPP-WLAN interworking network through the WLAN AN, the WLAN UE or the network initiating an authentication procedure, now taking that it is the WLAN UE initiating the authentication procedure as an example, the WLAN UE then sending an Authentication Request to the WLAN AN at first;

Steps 402-403: On receiving the Authentication Request, the WLAN AN starting an authentication procedure with the WLAN UE, i.e. an Expandable Authentication Protocol (EAP) procedure. Concretely, the WLAN AN sending a User Identity Request message to the WLAN UE requesting for the User Identity of the current WLAN UE; On receiving the request, the WLAN UE deciding network selection information based on the information of the WLAN covering the WLAN UE and/or the WLAN information stored in the WLAN UE, e.g. according to the detected matching results of the AP identity of current WLAN and the AP identity stored in itself, and sending a Response UID message containing the network selection information to the WLAN AN, which is shown by Steps 502-503 in FIG. 5.

The network selection information can be configured in the UID field defined by NAI format. Taking that the network selection information is configured in the UID field as an example, the UID field comprises two parts: User Identity and Realm. Here, the identity information of WLAN AN can be the MAC address(es) of the WLAN AP(s) in a WLAN AN; the matching actually refers to: looking up in the identity information of the WLAN AP the WLAN UE stored in itself for the identity information of the current WLAN AP. The identity information of the WLAN AP is stored each time the WLAN UE successfully accesses a mobile communication network. if the identity information of the current WLAN AP is found, it means the WLAN UE has successfully accessed that WLAN AP before, thus the network selection information once successfully used can be used for another time; otherwise, it means the WLAN UE has not successfully accessed that WLAN AP before, thus the WLAN UE should try to access the pre-configured mobile communication network with highest priority.

A valid survival time can be set for each of the stored network selection information, under the circumstances of finding the identity information of the current WLAN AP in the identity information of WLAN AP stored in the WLAN UE. If the valid survival time is not expired, the corresponding network selection information stored can still be used; otherwise, it tries to access the pre-configured mobile communication network with highest priority. The identity information of current WLAN AP and the corresponding network selection information can be deleted immediately or be deleted at a proper time according to the demands of users.

The valid survival time should be reset each time the WLAN UE stores the network selection information; and if the WLAN UE does not store the network selection information, the valid survival time will be consumed constantly. So-called consume can adopt a time-decreasing mode or a time-increasing mode of consumption. Moreover, if the successful access of the current WLAN UE experiences a procedure of network re-selection utilizing the information advertised by the network, even though the network information of the current successful access is the same as the network selection information stored in the WLAN UE, and the network selection information is not re-stored, the valid survival time needs to be reset.

The value of the valid survival time can be changed by users. For example, when a user needs to stay about 5 days in a roaming country, knowing the status of the AN will not change everyday or the location of the user will have no obvious change, he can set the valid survival time storing previous network selection information as 1 day; and moreover, if the user accesses the network to work on a relatively fixed location everyday, he implements network selection only once a day, with an access time delay. The valid survival time can also be directly set as 5 days, after selecting a network for the first time when the user arrives the roaming county, and he basically needs no network selection except when the AN changes, this way the access procedure can be optimized greatly.

In the same way, the valid survival time can be changed as valid usage times, within which the stored corresponding network selection information can still be adopted. If the valid usage times are consumed, the pre-configured mobile communication network with highest priority can be adopted to try to access. The identity information of the current WLAN AP and corresponding network selection information can be deleted immediately or can be deleted at a proper time according to the demand of the user. Moreover, both the usage and update of the valid usage time are similar to those of the valid survival time.

In addition, a threshold of the information number permitted to be stored should be configured for each WLAN UE to control the information quantity stored in the WLAN UE; before storing the information, the WLAN UE judges whether the information can be stored, if so, stores right along; otherwise, deletes some old or selected information at first, and then stores the information. Here, the old information can be the information which has not been used for a long time or overdue information or information exceeding the usage time but has not been deleted immediately or information is about to be overdue or is about to exceed the usage time, i.e. the valid survival time or the valid usage times are up to the most; for the stored information with equal valid survival time or valid usage times, the WLAN UE can select the information stored earlier to be deleted, or delete the selected information according the demand of the user.

Steps 404-405: after receiving a response message carrying network selection information, the WLAN AN analyzing the UID field of the response message; judging whether the network selection information carried in the UID field indicates a mobile communication network to which the WLAN AN is able to route an authentication request, if yes, proceeding to Step 406; otherwise, WLAN AN can not identify the mobile communication network carried in the network selection information, and then proceeding to Step 407.

Step 406: determining the mobile communication network the current WLAN UE about to access according to the network selection information in NAI of the UID field, the WLAN AN sending an Authentication Request of the current WLAN UE to the mobile communication network indicated in the network selection information to implement authentication.

Figure 5:
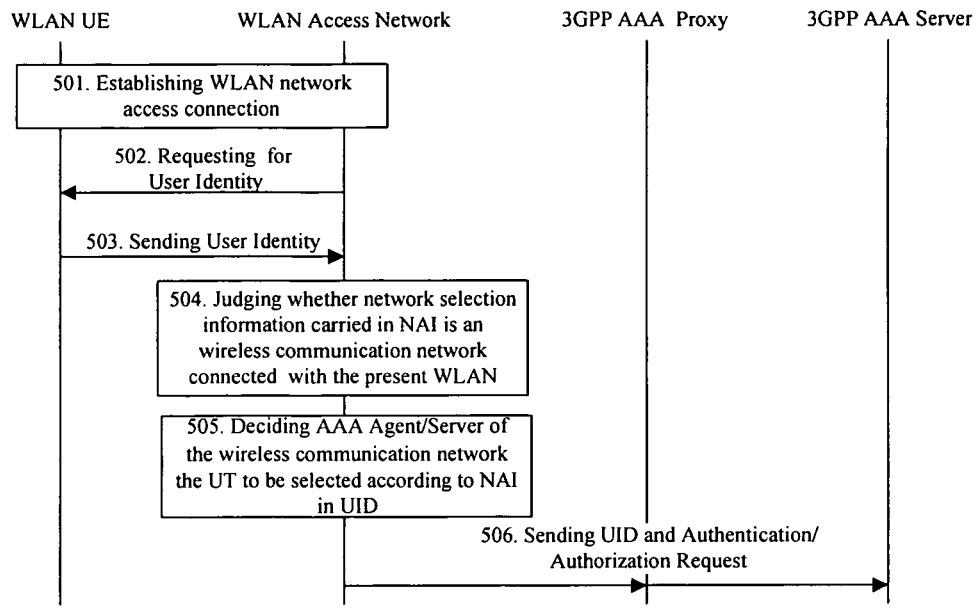
FIG. 5 is a flow diagram of signal illustrating the authentication and authorization process according to one embodiment of the present invention.

Here, if the WLAN AN finds that the visited network information is contained in the UID field according to the network selection information carried in the UID field, according to the visited network information in the UID field, the WLAN AN sends the Authentication Request to the AAA Proxy in the visited network that covers the WLAN UE, and the AAA Proxy transfers the Authentication Request to the 3GPP AAA Server in the home network of the WLAN UE to implement authentication; otherwise, the WLAN AN sends the Authentication Request to the AAA Server in the home network of the WLAN UE to implement authentication, which is shown by Step 506 in FIG. 5. Wherein, after receiving the Authentication Request of the WLAN UE, the AAA Proxy in the visited network judges that the visited network information contained in the UID field is the information of the present network, then the Realm part of the UID field will be modified to Domain Name of the home network only, and the modified request will be sent to the home network of the WLAN UE.

If the current WLAN network of a WLAN UE is directly connected with the home network of the WLAN UE, and the WLAN UE initiates the Authentication Request by adopting the roaming identity, i.e. the carried network selection information contains visited network information, the current network can directly modify the visited network information in User Identity field NAI to the home network information; or the current network can send a notification to prompt the WLAN UE that the network covering the user is the home network of the user, if the WLAN UE initiates the Authentication Request through home network information again, the current network directly completes the authentication procedure, but if the WLAN UE still affirms to select the roaming network, the current network implements authentication and provides the subsequent services for the WLAN UE through the roaming network.

Steps 407-408: the network side sending a notification signal to the current WLAN UE, and the current WLAN UE continuing with subsequent operations according to the content of the notification signal. Here, the notification signal can adopt notification message EAP-Request/Notification of WLAN protocols or a specially set notification signal. The network sending notification signal to the WLAN UE can be divided into two instances: one is the mobile communication network information advertised by the network is directly contained in the notification signal, so that the WLAN UE or users can select the mobile communication network directly; the other is that the notification signal is just a signal informing the current WLAN UE that the current selected mobile communication network information is invalid and indicating the WLAN UE to download mobile communication network information.

For the first instance, since the notification signal contains the information of the mobile communication network that the present WLAN connects with, after receiving the information, the WLAN UE can select a mobile communication network once again, and obtain the network information corresponding to the selected mobile communication network according to the network information in the notification signal, and the WLAN UE inserts the information of the selected mobile communication network in the User Identity field NAI of the response message and sends it to the WLAN AN for judging, then returns to Step 403. Here, the network can wait for the selection response of the WLAN UE after sending the notification signal, and after waiting for a definite time, if the network does not receive any response, the network sends a Selection Result Request to the WLAN UE on its own initiative; the network can also finish the current processing flow without waiting for the selection response of the WLAN UE after sending the notification signal, and a second authentication process is initiated by the WLAN UE over again on its own initiative.

For the second instance, after the WLAN UE receiving the notification signal, whether to download the mobile communication network information can be selected by the WLAN UE automatically or by the user, the WLAN UE automatically selecting refers to the WLAN UE can automatically process the information sent by the network according to the parameters the user set in advance, and select a proper mobile communication network automatically; the information can also be shown to the user for selecting the mobile communication network when it is necessary, for example, pops up a menu for the user to select a proper network, and when the information is shown to the user, the WLAN UE can show the information having roaming relationship with the home network of the user. If downloading the mobile communication network information is needed, the WLAN UE returns a response of needing download network information to the network; and after receiving the response, the network sends the mobile communication network information to the WLAN UE; after obtaining the mobile communication network information, the WLAN UE re-selects a mobile communication network and re-initiates an Authentication Request carrying the new network selection information, and returns to Step 403; if downloading the mobile communication network information is not needed, the WLAN UE does nothing or returns a response denoting that downloading is not needed. Here, the network can wait for a selection response of the WLAN UE after sending the notification signal, and after waiting for a definite time, if the network does not receive any response, the network sends a Selection Result Request to the WLAN UE on its own initiative; the network can also finish current processing flow without waiting for the selection response of the WLAN UE after sending the notification signal, and a second authentication process is initiated by the WLAN UE once again on its own initiative.

Under the above two circumstances, the mobile communication network information provided by the network to the WLAN UE for selecting the mobile communication network is stored in a special network information storing unit, it commonly comprises the following parameters: Network Name, Network Bearer Capacity, QoS, Bandwidth, Service Capacity, WLAN Scenario provided, Rate, Service Type and so on. When the network advertises the mobile communication network information of the current WLAN connection, it can select the information of visited networks having roaming relationship with the home network of the current WLAN UE to be advertised; if there is no such visited network information, the network will not send the information or informs the user that no roaming relationship exists.

After the present access succeeds, the current WLAN UE will store the MAC address information of the current AP, and regard the current successfully accessed mobile communication network as the network selection information corresponding to MAC address information of the current AP which will be stored together with the MAC address. Of course, if the present access adopts the network selection information that the current WLAN UE stored in it, the mobile communication network information does not need to be stored anymore.

For roaming users, in the above scheme, if the AP of the WLAN covering the roaming WLAN UE changes, the WLAN UE will select an optimal mobile communication network to access rapidly in time, and the identity information of current WLAN AP and its corresponding network selection information will be stored after each successful access.

In the above scheme, the judgment of the network selection information in Step 405 and the transmission of the notification information in Step 407 can be implemented by the same network entity, which can be called as Network Information Judgment and Notification Transmission Unit, and the Network Information Judgment and Notification Transmission Unit can be configured in a WLAN AN, such as in an Access Control (AC) device; it also can be configured out of the current WLAN AN and in a certain mobile communication network connected with the current WLAN AN to serve more than one WLAN AN, such as in a AAA Server; a default AAA Proxy also can be configured in advance as the Network Information Judgment and Notification Transmission Unit.

In the above scheme, if the authentication flow is initiated by the WLAN UE, and the WLAN UE can not determine the mobile communication network to be selected when it implements authentication, the WLAN UE can send a request for downloading information of the mobile communication network connected with the current WLAN AN to the network before sending the Authentication Request, during the process of sending the Authentication Request or during the authentication procedure, i.e. the WLAN UE can initiate the authentication procedure after obtaining the mobile communication information and selecting a network; or the downloading information procedure and the authentication procedure are implemented at the same time. Here, the WLAN UE can adopt EAP signaling or Portal interactive mode to send the downloading network information request to the network. The WLAN UE can also send a request for downloading information of the mobile communication network connected with the current WLAN AN to the network after receiving the Request User Identity Message sent from the WLAN AN; the request can be sent as an independent signal, and the request identity can also be set in the Response User Identity Message, for example, the Response User Identity is empty and downloading request field set in advance is configured, or directly appoint that the User Identity in the response is 0XFFFF denoting that downloading of the network information is needed.

Figure 6:
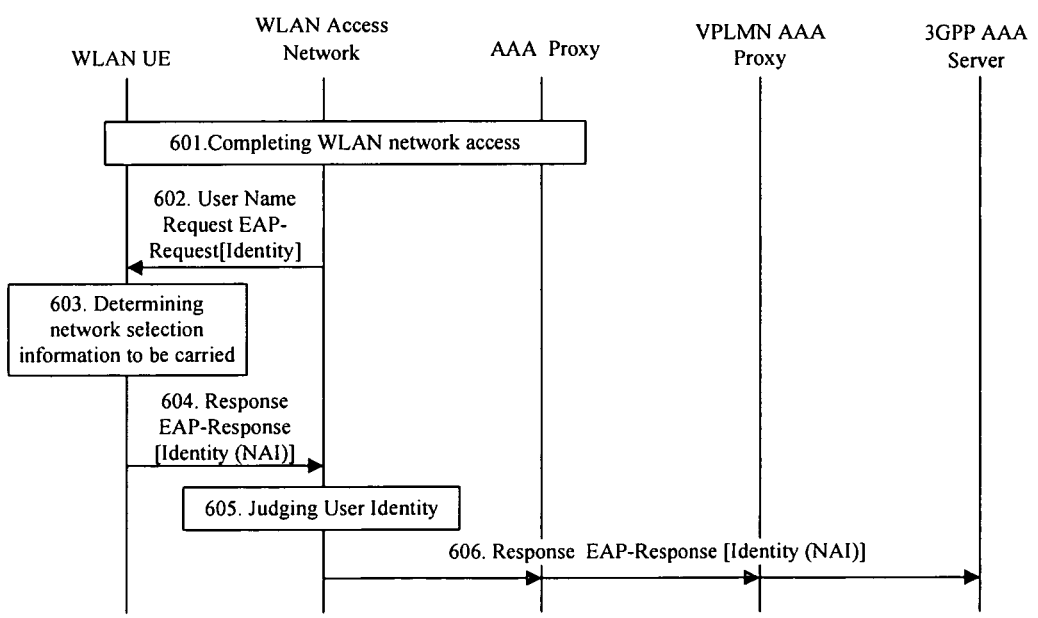
FIG. 6 is a flow diagram of signal illustrating an interacting process for the WLAN UE fast selecting an optimal mobile communication network to access according to one embodiment of the present invention.

FIG. 6 is a flow chat illustrating an interacting process for the WLAN UE fast selecting an optimal mobile communication network to access according to an embodiment of the present invention, the precondition of implementing the present embodiment is: in a 3GPP-WLAN interworking network, the current WLAN UE has successfully accessed mobile communication network A, B, C through certain APs, and the WLAN UE has stored the MAC address information of APs and network information of mobile communication network A, B, C of each successful access; in this embodiment, the MAC address of APs it stores is matching with the MAC address of current AP, and judgment is made whether the AP changes and whether the corresponding network selection information can be used. As shown in FIG. 6, take that mobile communication network A matches the MAC address of current AP as an example, the interacting process of the WLAN UE fast selecting a mobile communication network to access comprises the following steps:

Steps 601-602: after establishing a mobile connection between a WLAN UE and a WLAN AP, the WLAN UE sending an Authentication Request to the WLAN AN; after receiving the request, the WLAN AN sending an EAP-Request [Identity] to the WLAN UE.

Steps 603-604: after receiving the EAP-Request [Identity], the user detecting MAC address of the current WLAN AP covering itself, and comparing it with the MAC addresses of APs stored in the WLAN UE; since the WLAN UE has stored the MAC address of current AP, when the MAC address of current detected AP matches with the AP MAC address stored, the WLAN UE determining that the network information of mobile communication network A corresponding to matching AP MAC address is the network selection information to be carried.

Then, the WLAN UE sending an EAP-Response [Identity] carrying User Identity field of NAI format to the WLAN AN and the network information of mobile communication network A is carried in the User Identity field.

Steps 605-606: the WLAN AN determining mobile communication network A to be accessed by the WLAN UE according to the User Identity field in the received message, and directly sending the Authentication Request information to the AAA Proxy and AS in mobile communication network A to implement authentication process.

After successfully accessing this time, since the current WLAN UE adopts certain network selection information it stores, it does not need to add AP MAC address and the corresponding network selection information of WLAN the WLAN UE currently stores. Moreover, if a valid survival time or a valid usage time has been set for the stored network selection information, the valid survival time or the valid usage time will be consumed continuously.

Figure 7:
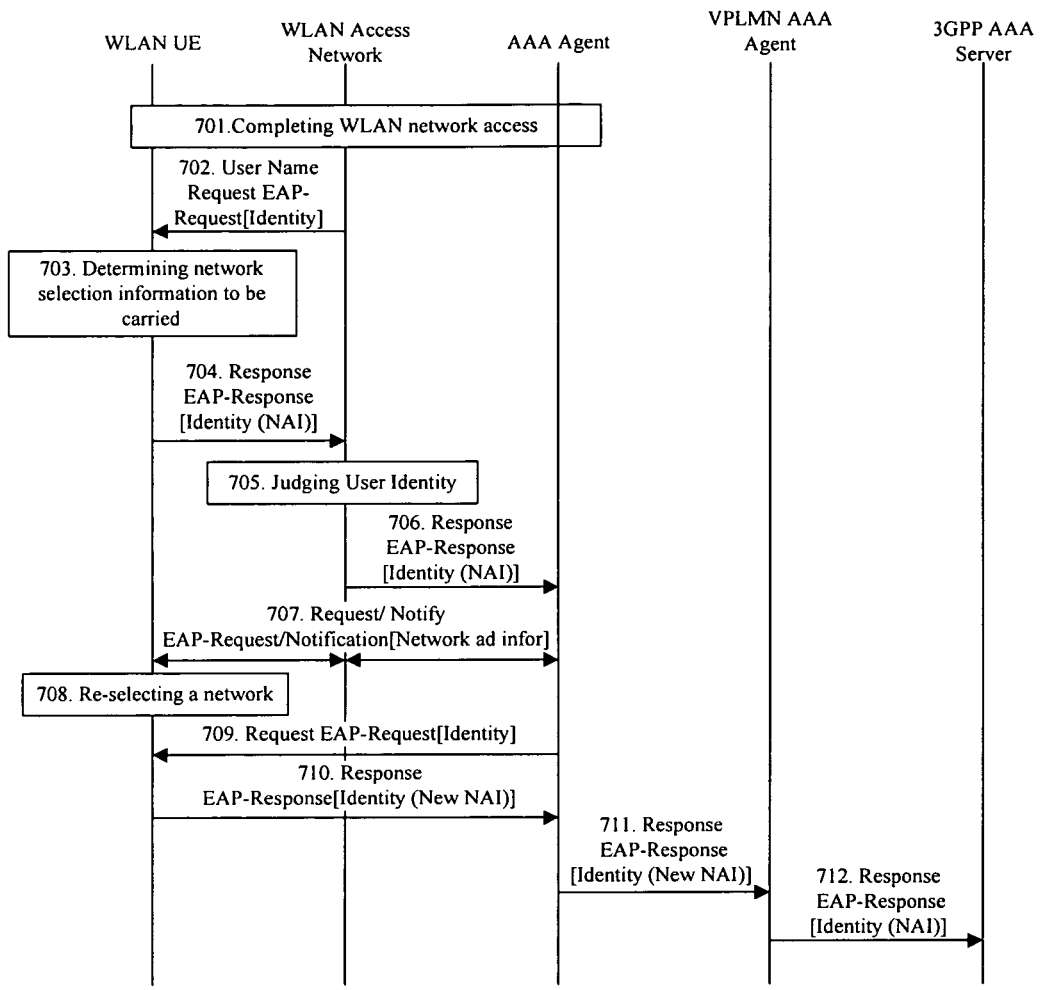
FIG. 7 is a flow diagram of signal illustrating an interacting process for the WLAN UE fast selecting an optimal mobile communication network to access according to one embodiment of the present invention.

FIG. 7 is a flow chart illustrating an interacting process for the WLAN UE fast selecting an optimal mobile communication network to access according to another embodiment of the present invention. The precondition of implementing the present embodiment is: in a 3GPP-WLAN interworking network, the current WLAN UE has successfully accessed mobile communication network A, B, C through certain APs, and the WLAN UE has stored the MAC address information of APs and the network information of mobile communication network A, B, C of each successful access; a default optimal network selection information has been configured; the WLAN UE has roamed out of the last WLAN AP and entered in a new WLAN AP; in the present embodiment, judgment is made whether the WLAN AP changes and whether the corresponding network selection information can be used according to MAC address of AP. As shown in FIG. 7, the interacting process of the WLAN UE selecting a mobile communication network to access comprises the following steps:

Steps 701-702: after establishing a mobile connection between a WLAN UE and a WLAN AP, the WLAN UE sending an Authentication Request to the WLAN AN; after receiving the request, the WLAN AN sending an EAP-Request [Identity] to the WLAN UE.

Steps 703-704: after receiving the EAP-Request [Identity], the user detecting the MAC address of the current WLAN AP covering itself, and comparing it with the MAC addresses of APs stored in it; since the WLAN AP of the WLAN UE changes, the AP MAC address currently detected is not matching with the AP MAC addresses the WLAN UE stores, so the WLAN UE regards the default optimal network selection information as the network selection information to be carried.

Then, the WLAN UE sending an EAP-Response [Identity] carrying User Identity field of NAI format to the WLAN AN and the default optimal network selection information is carried in the User Identity field.

Steps 705-706: the WLAN AN determining the transmission route of the Authentication Request of the WLAN UE according to the User Identity field in the received message, but the WLAN AN finding out the User Identity field can not be identified, i.e. the User Identity field does not belong to one of the mobile communication networks connected with the WLAN, then the Authentication Request will be routed to a default AAA Proxy.

Step 707: after receiving the Authentication Request, the default AAA Proxy finding out the network selection information does not accord with any mobile communication network connected with the WLAN, and sending an EAP-Request/Notification to the WLAN AN; then the WLAN AN sending the notification signal to the WLAN UE. According to EAP protocols, after receiving the signal, the WLAN AN and the user will response immediately to indicate that they have received the signal. The notification signal carries the information of mobile communication networks connected with the WLAN, one or more than one notification signal can be sent, and finishing interaction is determined according to the indication information in the last EAP message.

Step 708: after receiving the mobile communication network information carried in the notification signal, the WLAN UE re-implementing a network selection. Here, after sending the notification signal, the AAA Proxy and the WLAN AN will wait for a response of the WLAN UE.

Steps 709-710: the AAA Proxy sending an EAP-Request [Identity] signal to the current WLAN UE again to request for User Identity. After receiving the request, the WLAN UE returning the User Identity carrying new network selection information through the EAP-Response [Identity] message.

Steps 711-712: the WLAN determining the mobile communication network to be accessed by the WLAN UE according to the new network selection information sent by the current WLAN UE, here the mobile communication network refers to a VPLMN network, and sending the Authentication Request to the AAA Proxy and AS in the identified VPLMN network to implement authentication process.

After successfully accessing this time, the WLAN UE judges whether the information of the mobile communication network currently successfully accesses is the same as the network selection information corresponding to the AP MAC address of the current WLAN. If they are not the same, the WLAN UE will store the AP MAC address of current WLAN and the information of the mobile communication network currently successfully accesses; otherwise, the WLAN UE will not store the AP MAC address. Moreover, if a valid survival time or valid usage times have been set for the stored network selection information, for the circumstances of storing the AP MAC address of current WLAN and the information of the mobile communication network currently successfully accesses, the valid survival time or the valid usage time needs to be reset; for the circumstances of not storing the AP MAC address of current WLAN and the information of the mobile communication network currently successfully accesses and successfully accessing not through the stored network selection information, the valid survival time or the valid usage times also need to be reset, because the network selection information used this time is re-selected and experiences a procedure of obtaining information from network and re-selecting network.

What are described above are just some relatively preferable embodiments of the present invention, and they are not intent to limit the protection range of the invention.

The invention claimed is:

1. A method for a user equipment (UE) to select a mobile communication network to access through a Wireless Local Area Network (WLAN) access network (AN), wherein the mobile communication network is a different network from the WLAN AN, the method comprising:

sending, by the UE, an authentication request message to a second access point (AP) of the WLAN AN after a connection between the UE and the WLAN AN has been established;

receiving, by the UE, a User Identity Request message from the second AP;

obtaining, by the UE, information of the second AP that identifies the second AP;

determining, by the UE, whether the information of the second AP matches information of a first AP of the WLAN AN stored in the UE, wherein if the UE previously successfully accessed a first mobile communication network through the first AP, information of the first AP and information of the first mobile communication network are stored in the UE;

if the information of the second AP matches the information of the first AP stored in the UE, returning, by the UE, a first User Identity Response message to said second AP, wherein the first User Identity response message carries the stored information of the first mobile communication network;

wherein the information of the first mobile communication network carried in the first User Identity response message is used by the second AP to forward the authentication request message to the first mobile communication network.

2. The method according to claim 1:

wherein if the information of the second AP does not match information of the first AP stored in the UE, the method further comprises:

returning, by the UE, a second User Identity Response message to the second AP, wherein the second User Identity Response message carries information of a pre-configured mobile communication network with the highest priority;

wherein if the second AP determines that the second AP is able to route the authentication request message, it forwards the authentication request message to the pre-configured mobile communication network according to the information of the pre-configured mobile communication network carried in the second User Identity Response message; or if the second AP determines that the second AP is not able to route the authentication request message, it sends a notification signal to the UE, wherein the notification signal indicates the UE to perform subsequent operations.

3. The method according to claim 2, if it is determined that the information of the second AP is not stored in said UE when the UE has successfully accessed the pre-configured mobile communication network, the method further comprises:

storing the information of the second AP and the information of the pre-configured mobile communication network.

4. The method according to claim 2, wherein, said pre-configured mobile communication network with the highest priority is a home network.

5. The method according to claim 2, wherein, said information of the first AP or the second AP is an Access Point Identity (APID) or a Service Set Identity (SSID), and wherein said Access Point Identity (APID) is a Media Access Control (MAC) address of an Access Point (AP).

6. The method according to claim 2, wherein the stored information of the first mobile communication network has a valid survival time, and the method further comprising:

determining whether the valid survival time of the stored information of the first mobile communication network has exceeded;

and wherein if the information of the second AP matches information of the first AP stored in the UE and that the valid survival time of the stored information of the first mobile communication network has not exceeded, the stored information of the first mobile communication network corresponding to the matched first AP is carried in the first User Identity response message; or if it is determined that the valid survival time of the stored information of the first mobile communication network has exceeded, the information of the pre-configured mobile communication network with the highest priority is carried in the second User Identity response message.

7. The method according to claim 2, wherein the stored information of the first mobile communication network has a valid usage times and the method further comprising:

determining whether the valid usage times of the stored information of the first mobile communication network has been consumed, and wherein if the information of the second AP matches information of the first AP stored in the UE and that the valid usage times of the stored information of the first mobile communication network has not been consumed, the stored information of the first mobile communication network corresponding to the matched first AP is carried in the first User Identity response message; or if it is determined that the valid usage times of the stored information of the first mobile communication network has been consumed, the pre-configured mobile communication network with the highest priority is carried in the first User Identity response message.

8. The method according to claim 6, further comprising:

deleting the information of the first AP and the corresponding information of the first mobile communication network stored in the UE, when the valid survival time corresponding to the information of the first mobile communication network is exceeded.

9. The method according to claim 1, wherein said information of the first mobile communication network is contained in a Network Access Identity (NAI).

10. The method according to claim 2, wherein the notification signal indicates that the information of the pre-configured mobile communication network is invalid and downloading of information of a third mobile communication network is needed, and wherein the method further comprises:

after receiving the notification signal, returning, by the UE a response to the second AP, wherein the response indicates the downloading of the information of the third mobile communication network;

whereby the information of the third mobile communication network is sent to said UE upon the second AP receiving the response;

after receiving the information of the third mobile communication network re-sending an Access Authentication Request carrying said information of the third mobile communication network to the second AP.

11. The method according to claim 1, wherein, said mobile communication network is a 3GPP network.

12. The method according to claim 1, wherein, said first mobile communication network is a public land mobile network (PLMN).

13. The method according to claim 7, further comprising:

deleting the information of the first AP and its corresponding information of the first mobile communication network stored in the UE, when the valid usage times corresponding to the information of the first mobile communication network have been consumed.

14. A system for selecting a mobile communication network to access through a Wireless Local Area Network (WLAN) access network (AN), comprising a user equipment (UE) in communication with a first Access Point (AP) and a second AP of the WLAN AN, wherein the mobile communication network is a different network from the WLAN AN;

wherein the UE is configured to:
send an authentication request message to the second AP after a connection between the UE and the WLAN AN has been established;
receive a User Identity Request message from the second AP;
obtain information of the second AP that identifies the second AP;
determine whether the information of the second AP matches information of the first AP stored in the UE, wherein if the UE previously successfully accessed a first mobile communication network through the first AP, information of the first AP and information of the first mobile communication network are stored in the UE;
if the information of the second AP matches the information of the first AP stored in the UE, return a first User Identity Response message to the second AP, wherein the first User Identity Response message carries the stored information of the first mobile communication network; and
the second AP is configured to:
receive the first User Identity Response message;
forward the authentication request message to the first mobile communication network according to the information of the first mobile communication network carried in the first User Identity Response message indicated in the network selection information.

15. A user equipment (UE) for selecting a mobile communication network to access through a Wireless Local Area Network (WLAN) access network (AN), wherein the UE communicates with a first Access Point (AP) and a second AP of the WLAN AN, wherein the mobile communication network is a different network from the WLAN AN;
wherein the UE comprises:
a transmitter, configured to send an authentication request message to the second AP after a connection between the UE and the WLAN AN has been established;
a receiver, configured to receive a User Identity Request message from the second AP, and obtain information of the second AP that identifies the second AP;
a processor, configured to determine whether the information of the second AP matches information of the first AP stored in the UE, wherein if the UE previously successfully accessed a first mobile communication network through the first AP, information of the first AP and information of the first mobile communication network are stored in the UE;
if the information of the second AP matches the information of the first AP stored in the UE, the transmitter is further configured to return a first User Identity Response message to the second AP, wherein the first User Identity Response message carries the stored information of the first mobile communication network;
wherein the information of the first mobile communication network carried in the first User Identity response message is used by the second AP to forward the authentication request message to the first mobile communication network.

* * * * *